(12) United States Patent
Singh et al.

(10) Patent No.: US 10,440,450 B2
(45) Date of Patent: Oct. 8, 2019

(54) SYSTEM AND METHODS FOR DYNAMIC POWER USAGE AND DATA TRANSFER RATE MANAGEMENT IN A SENSOR NETWORK

(71) Applicants: Ninoshka Krishan Singh, Somerville, MA (US); Joseph John Lacirignola, Beverly, MA (US); Christine Michelle Weston, Cambridge, MA (US); Andrew Peter Dumas, Somerville, MA (US); David Christopher Maurer, Stoneham, MA (US); David Francis Aubin, Jr., Pelham, NH (US); Erik Metzger, Lincoln, MA (US)

(72) Inventors: Ninoshka Krishan Singh, Somerville, MA (US); Joseph John Lacirignola, Beverly, MA (US); Christine Michelle Weston, Cambridge, MA (US); Andrew Peter Dumas, Somerville, MA (US); David Christopher Maurer, Stoneham, MA (US); David Francis Aubin, Jr., Pelham, NH (US); Erik Metzger, Lincoln, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 190 days.

(21) Appl. No.: 15/210,581

(22) Filed: Jul. 14, 2016

(65) Prior Publication Data
US 2018/0019894 A1 Jan. 18, 2018

(51) Int. Cl.
*H04Q 9/00* (2006.01)
*H04L 29/08* (2006.01)
*H04L 12/70* (2013.01)

(52) U.S. Cl.
CPC ............... *H04Q 9/00* (2013.01); *H04L 67/12* (2013.01); *H04L 67/26* (2013.01);
(Continued)

(58) Field of Classification Search
CPC combination set(s) only.
See application file for complete search history.

(56) References Cited

U.S. PATENT DOCUMENTS 7,983,685 B2 7/2011 Silverstrim et al.
8,244,260 B2 8/2012 Silverstrim et al.
(Continued)

FOREIGN PATENT DOCUMENTS

CN 102045833 A 5/2011
CN 102209400 A 10/2011
(Continued)

OTHER PUBLICATIONS

Moulton et al., Body Area Network transmission power control using variable adoptive feedback periodicity, IEEE 2010.
(Continued)

*Primary Examiner* — Yee F Lam
(74) *Attorney, Agent, or Firm* — McCarter & English, LLP; David R. Burns

(57) ABSTRACT

Described are systems, methods, and computer readable medium for dynamic power usage and data transfer rate management in a sensor network including synchronous and asynchronous links. Exemplary embodiments provide a lightweight communication protocol enabling dynamic management of data buffer size in a sensor network and corresponding control of power usage and data transfer rates in the sensor network.

20 Claims, 13 Drawing Sheets

(52) U.S. Cl.
CPC ...... *H04L 67/2814* (2013.01); *H04L 67/2823* (2013.01); *H04L 67/2833* (2013.01); *H04L 2012/5681* (2013.01); *H04Q 2209/30* (2013.01)

(56) References Cited

U.S. PATENT DOCUMENTS

| | | |
|---|---|---|
| 8,531,288 B1 | 9/2013 | Khan et al. |
| 8,896,442 B1 | 11/2014 | Khan et al. |
| 2008/0137624 A1 | 6/2008 | Silverstrim et al. |
| 2009/0030279 A1* | 1/2009 | Zander ............... A61B 1/00036 600/118 |
| 2011/0152632 A1* | 6/2011 | Le Neel ............... A61B 5/0022 600/300 |
| 2011/0280154 A1 | 11/2011 | Silverstrim et al. |
| 2012/0026898 A1 | 2/2012 | Sen et al. |
| 2012/0086568 A1 | 4/2012 | Scott et al. |
| 2014/0126431 A1 | 5/2014 | Hui et al. |
| 2015/0182160 A1* | 7/2015 | Kim ..................... A61B 5/0488 600/301 |
| 2015/0249486 A1 | 9/2015 | Stratigos, Jr. |
| 2016/0266793 A1* | 9/2016 | Saito ..................... G06F 3/0611 |
| 2018/0006971 A1* | 1/2018 | Fukuda .................... G06F 13/38 |
| 2018/0098277 A1* | 4/2018 | Brageul .............. H04W 52/028 |

FOREIGN PATENT DOCUMENTS

| | | |
|---|---|---|
| CN | 202873071 U | 4/2013 |
| EP | 2378822 A2 | 10/2011 |
| KR | 10-0776804 B1 | 11/2007 |
| WO | 2009134005 A1 | 11/2009 |

OTHER PUBLICATIONS

Rao et al., Adaptive Transmission Power Protocolfor Heterogeneous Wireless Sensor Networks, IEEE 2015.

Vallejo et al., Proactive and Reactive Transmission Power Control for Energy-Efficient On-Body Communications, Sensors 2015, 15, 5914-5934.

* cited by examiner

SYSTEM AND METHODS FOR DYNAMIC POWER USAGE AND DATA TRANSFER RATE MANAGEMENT IN A SENSOR NETWORK

STATEMENT OF GOVERNMENT SUPPORT

This invention was made with Government support under Contract No. FA8721-05-C-0002 awarded by the U.S. Air Force. The Government has certain rights in the invention.

BACKGROUND

In the field of bioengineering, gathering data from a human body is of high interest. One data gathering technique includes smart wearable clothing embedded with sensors to sense data from various parts of the human body. Among other uses, the gathered data may be analyzed to better understand body movements.

BRIEF SUMMARY

Embodiments of the present invention provide systems and methods for dynamic power usage and data transfer rate management in a sensor network that includes both synchronous links for bidirectional synchronous communication such as sending and receiving requests and response data and asynchronous links for event-based callbacks to send notifications when data or a response is ready. Embodiments efficiently require low amounts of power while providing high data speed and increasing security through a wired approach that provides low detectability to entities outside the network. In some embodiments, a root node may be configured to dynamically increase the size of a data buffer holding sensor data that is maintained by a link node in order to reduce a rate of data transfer and conserve power in the sensor network. Further, in some embodiments, the root node may be configured to dynamically decrease the size of the data buffer maintained by the link node to increase a rate of data transfer and power usage in the sensor network.

In one embodiment, a system for dynamic power usage and data transfer rate management in a sensor network that includes synchronous links and asynchronous links also includes a root node, a link node and multiple sensors. The root node includes a microcontroller or microprocessor device and is configured to generate and send a data read request command to one of the sensors. The link node maintains one or more data buffers and is in wired communication with the root node and is configured to receive the data read request command from the root node. The link node routes the data read request command to a destination sensor among the multiple sensors. Each of the sensors is in wired communication with the link node. The destination sensor is configured to sense data and store the data in at least one of the one or more data buffers maintained by the link node based on the data read request command. The root node is also configured to dynamically increase or decrease a size of the one or more data buffers maintained by the link node to manage power usage and data transfer rates in the sensor network.

In another embodiment, a method for dynamic power usage and data transfer rate management in a sensor network that includes synchronous links and asynchronous links also includes generating at a root node a data read request command for a destination sensor among multiple sensors, and sending the data read request command to a link node in wired communication to the root node. The link node maintains one or more data buffers. The data read request command is routed from the link node to the destination sensor among the multiple sensors. The multiple sensors are each in wired communication with the link node. The method further includes sensing data at the destination sensor in response to receiving the data read request command. The sensed data is stored in at least one of the one or more data buffers maintained by the link node. The method also dynamically increases or decreases a size of the one or more data buffers maintained by the link node to manage power usage and data transfer rates in the sensor network in response to a command received from the root node.

In an embodiment, a non-transitory computer readable medium stores instructions for dynamic power usage and data transfer rate management in a sensor network including synchronous links and asynchronous links. The instructions when executed by a processor generating at a root node a data read request command for a destination sensor among multiple sensors and sending the data read request command to a link node in wired communication to the root node. The link node maintains one or more data buffers. The data read request command is routed from the link node to the destination sensor among the multiple sensors. The multiple sensors are each in wired communication with the link node. The execution of the instructions further causes the sensing of data at the destination sensor in response to receiving the data read request command. The sensed data is stored in at least one of the one or more data buffers maintained by the link node. The instructions execution further dynamically increases or decreases a size of the one or more data buffers maintained by the link node to manage power usage and data transfer rates in the sensor network in response to a command received from the root node.

BRIEF DESCRIPTION OF DRAWINGS

The accompanying drawings, which are incorporated in and constitute a part of this specification, illustrate one or more embodiments of the invention and, together with the description, help to explain the invention. The embodiments are illustrated by way of example and should not be construed to limit the present disclosure. In the drawings.

DESCRIPTION OF EXEMPLARY EMBODIMENTS

Figure 1:
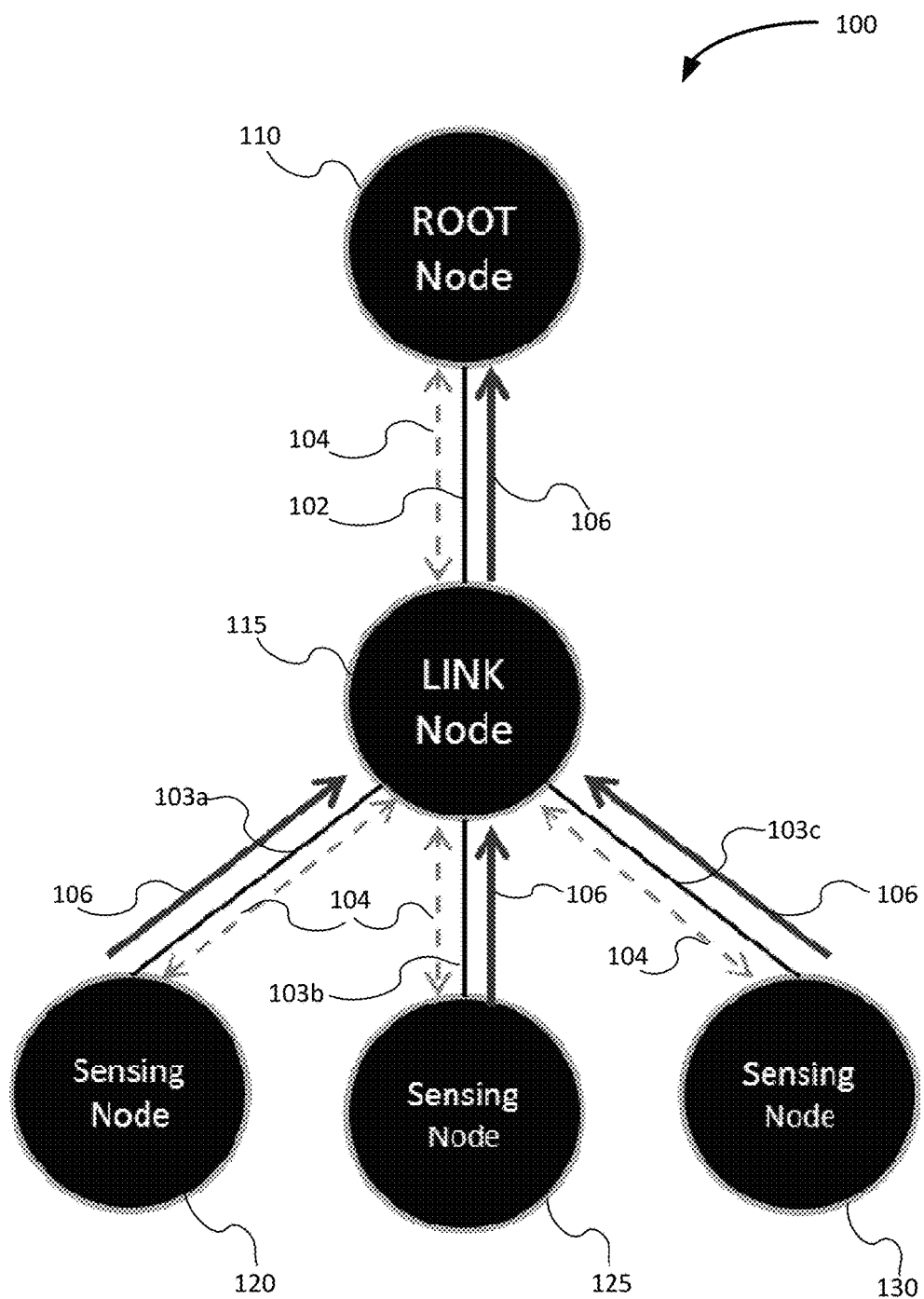
FIG. 1 depicts an exemplary sensor network with synchronous and asynchronous links, according to an example embodiment.

Described in detail herein are systems, methods, and computer readable medium for dynamically managing power usage and data transfer rates in a sensor network. Exemplary embodiments provide a sensor network including a root node, a link node, and multiple sensors in wired communication. As explained more fully below, the root node and the link node may be microcontroller devices. The sensor network supports synchronous and asynchronous communications. Nodes in the network can communicate with each other using synchronous messages to send and receive requests and response data, and asynchronous callbacks to send a notification when data or a response is ready. The sensor network system described herein provides a lightweight, reliable and high speed data communication protocol that provides power-efficient communication among sensors in a network that are connected by pairs of synchronous and asynchronous connection links. The exemplary software communication protocol implemented as part of the sensor network system described herein is designed to implement efficient, power-conservative TX/RX communication in a sensor network made up of physical, hardware links that support both synchronous and asynchronous communication.

The sensor network system described herein allows the root node, a central controlling node, to handle the majority of complex processing taking place in the sensor network, while link nodes, which function as intermediate routing nodes, perform less complex processing. Sensing nodes, which are usually sensors which do not perform routing but instead produce sensor data, perform only simple processing. In one embodiment, the sensor network system is designed so that the link nodes are not required to process native commands that are being sent by the root node to connected sensing nodes. The link nodes instead inspect attached metadata to forward these request messages to the destination sensing nodes to process, and in a reverse direction forward a response back up the communication path to the root node. This configuration greatly reduces the processing complexity in the network.

In some embodiments, the link node and/or the root node in the sensor network maintain respective data buffers for storing data including data gathered by the sensors. In other embodiments, some but not all link nodes and root nodes maintain their own data buffers. It should be appreciated that in some embodiments, the sensors may also include a data buffer within their hardware configuration that is not part of the communication protocol described herein. In one embodiment, when a data buffer is filled, an asynchronous message is sent to the root node requesting permission to empty the buffer and forward its data. In the case of the link node data buffer, once permission is granted the data is forwarded to the root node. Both the gathering of data by the sensors (also referred to herein as "sensing nodes") and the transmission of data by the sensors and link nodes uses power in the sensor network. In one embodiment, the root node dynamically controls power usage and data transfer rates by sending commands during operation to the link node or nodes to adjust the size of their respective data buffers (i.e. adjust the amount of available memory). Smaller data buffer sizes lead to more frequent requests to empty the data buffers and to more transmissions of data and therefore increases the data transfer rate and related power usage in the sensor network. Conversely, larger buffer sizes enable a sensor to collect more data before the buffer is filled and therefore reduce the number of transmissions of data occurring as a result of a full buffer thereby lowering power usage in the sensor network.

FIG. 1 depicts an exemplary sensor network 100 with synchronous and asynchronous links, according to an example embodiment. The exemplary sensor network 100 includes root node 110, link node 115, and multiple sensing nodes, such as sensing node 120, sensing node 125, and sensing node 130. The root node 110 is in wired communication with link node 115 via wire 102. The link node 115 is in wired communication with each of the sensing nodes 120, 125 and 130 via wires 103*a*, 103*b* and 103*c* respectively. In an example embodiment, the sensor network 100 includes serial peripheral interface bus (SPI) synchronous links 104, and universal asynchronous receiver/transmitter (UART) asynchronous callback links 106. When the root node 110 wants data from a sensor, it sends a message request to read a sensor's sample which is accessible via a native SPI command that is defined by the sensor. The root node 110 may create a data packet with metadata and the native SPI command(s) in the data packet payload, and send this message to the sensing node via the link node 115. The metadata identifies the destination sensor 120, 125 or 130, that is the sensor from which the root node 110 wants to read data. The link node 115 forwards the packet to the sensing node identified in the metadata instead of processing the SPI command directly. When a response is ready from the sensing node, an asynchronous callback is sent back up the path to the root node 110 via the link node 115. In this manner, the root node 110 can initiate the transmission of the response message back up the path. In some embodiments (discussed below), this communication protocol can be extended to more complicated sensor networks that have more than one link node, and possibly more than one root node.

In an embodiment, a link node is responsible for data management per the communication protocol described herein. The link node manages at least one data buffer (such as a data buffer in its microcontroller's memory, pursuant to the direction of the root node, that holds data collected from a sensing node so that the root node can control the data transfer rate of data as it is transferred from the link node to its parent link node or to the root node. This data transfer rate directly correlates to the amount of power used in the sensor network. The sensing node includes a sensor hardware device that is capable of sampling data in response to commands received from the root node and producing those samples either one at a time with an interrupt driven notification, or may additionally temporarily store samples in its own internal data buffer and provide interrupt driven notification when the buffer is full. The sensor samples are stored in the data buffer managed by the link node. The root node interacts with the sensing node, via the link node which forwards commands, using the sensor's native command language (for example, SPI commands) that are specific to the sensor.

Wireless connections require security protocols designed for those wireless connections that prevent unauthorized entities gaining access to the data being transmitted through the air. To reduce the need for these security protocols, the nodes in the sensor network system in embodiments of the present invention are connected via wired connections. Additionally, most wired communications consume less power compared to wireless communications. Furthermore, the wired sensor network described herein reduces complexity in terms of medium access contention. Since, a communication medium (a wire) is shared by no more than two nodes in the sensor network, the communication protocol need not moderate access to a shared medium among more than two devices. This contrasts with other system architectures utilizing a bus topology or wireless communications which require control or moderation of access of the shared medium.

Figure 2:
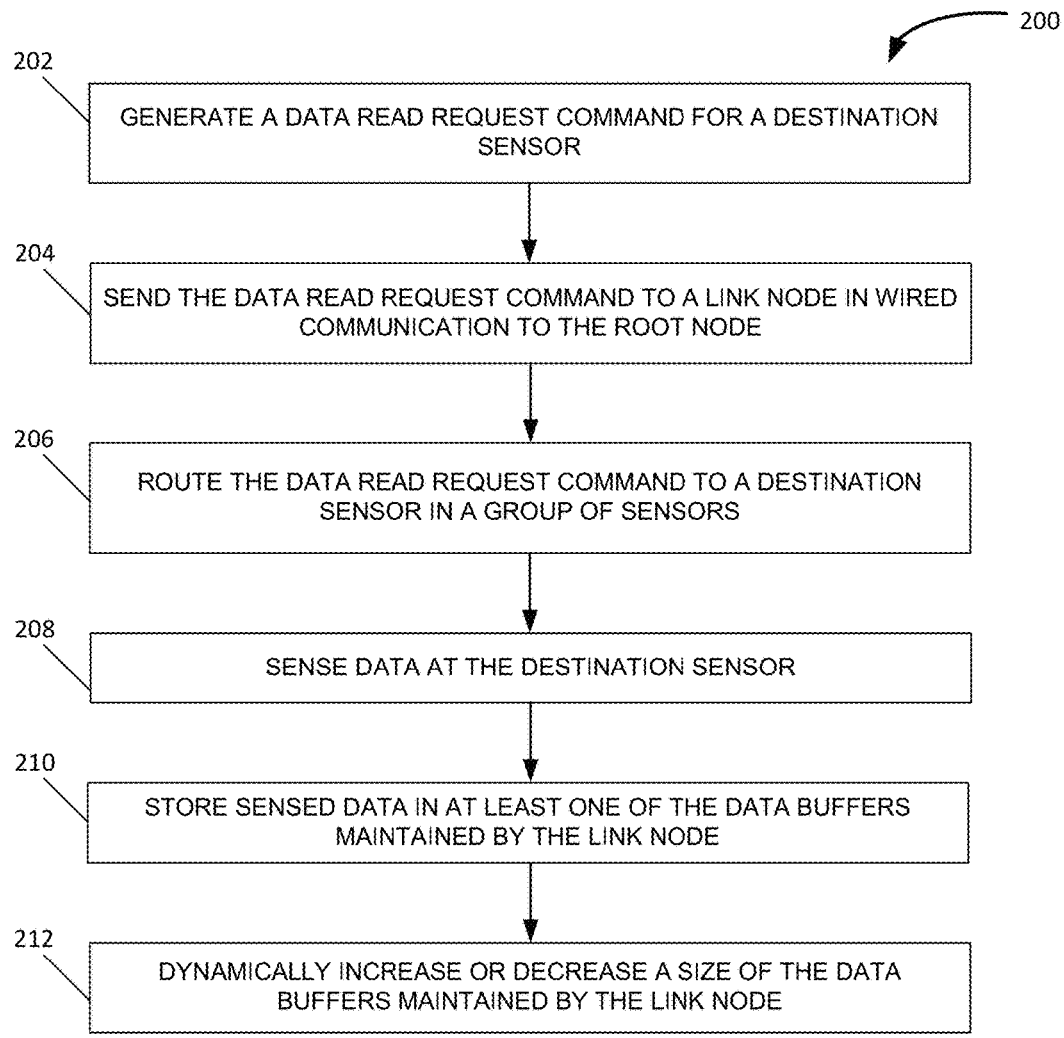
FIG. 2 is a flowchart showing an exemplary method for processing data in a sensor network, according to an example embodiment.

FIG. 2 is a flowchart showing an exemplary method 200 for processing data in a sensor network, according to an example embodiment. The method 200 begins at block 202 with the root node 110 generating a data read request command for a destination sensor among a group of sensors in wired connection with the link node. In some embodiments, the data read request command includes metadata identifying the destination sensor among the multiple sensors for the data read request.

At block 204, the root node 110 sends the data read request command to the link node 115. As described above, the root node 110 is in wired connection with the link node 115, and the root node 110 transmits communications to the link node 115 via the wired connection. The link node 115 maintains one or more data buffers. The data buffer may be a FIFO data buffer or a FIFO data structure. The link node 115 may maintain one data buffer for each of the sensing nodes 120, 125, and 130. In some embodiments, the link node 115 may also be in wired connection with another link node (e.g., a child link node). In this case, the link node 115 may also maintain a data buffer for the child link node.

At block 206, the link node 115 routes the data read request command to the destination sensor. In an example embodiment, the destination sensor is identified in the metadata accompanying the data read request command. As described above, the link node 115 is in wired connection with multiple sensing nodes 120, 125 and 130. The metadata accompanying the data read request command may identify one or more sensing nodes 120, 125 or 130 as the destination sensor, and the link node 115 reads the metadata and forwards the data read request command to the destination sensor. The link node 115 does not process the sensor read commands that control sampling of data by the sensors.

At block 208, the destination sensing node 120, 125 or 130 senses data based on the data read request command. The destination sensing node 120, 125, or 130 processes the data read request command to determine parameters for sensing data requested by the root node 110. At block 210, the sensed data is stored in a data buffer corresponding to the destination sensor that is maintained by the link node.

In an example embodiment, the destination sensing node 120, 125 or 130 generates a data sensing complete message indicating that the destination sensor has completed sensing data per the data read request command. The destination sensing node 120, 125 or 130 may also generate the data sensing complete message when a buffer in which the data is stored is full. The data sensing complete message is sent by the destination sensing node 120, 125 or 130 to the link node 115 using an asynchronous link.

In an example embodiment, the link node 115 sends a data ready message to the root node 110 indicating a full data buffer. In response to receiving the data ready message, the root node 110 may generate an "empty data buffer" message which is transmitted to the link node. After receiving the empty data buffer message, the link node sends the stored data from the data buffer maintained by the link node 115 to the root node 110. For example, in an embodiment, the link node 115 may generate and send a data ready message to the root node 110 when the data buffer maintained by the link node is full of data received from at least one the of sensors, and sends the stored data to the root node 110 after receiving approval from the root node 110. The data may be transmitted to the root node upon the link node data buffer reaching full capacity or another criteria being met.

At block 212, the root node 110 may dynamically increase or decrease the size of one or more data buffers maintained by the link node 115 to manage power usage and data transfer rates in the sensor network 100. The root node 110 may generate a command to dynamically control the size of the data buffers maintained by the link node 115. For example, the root node 110 may increase or decrease the size of the data buffers maintained by the link node 115 to cause a corresponding change in a rate of data transfer and thereby alter the amount of power used by the sensor network for data transfer. In response to a command from the root node 110, the size of the data buffers maintained by the link node is adjusted so as to manage power usage and data transfer rates in the sensor network.

In an example implementation, the sensor network may be embedded in clothing to monitor and sense physiological data of a human or mammalian body. In an example embodiment, the sensors are motion sensors, such as but not limited to, an accelerometer, gyro, or magnetometer. In another embodiment, the sensors may include physiological on-body sensors, such as but not limited to, electromyography (EMG) sensor, strain/load sensor, or electrocardiogram (ECG).

Figure 3:
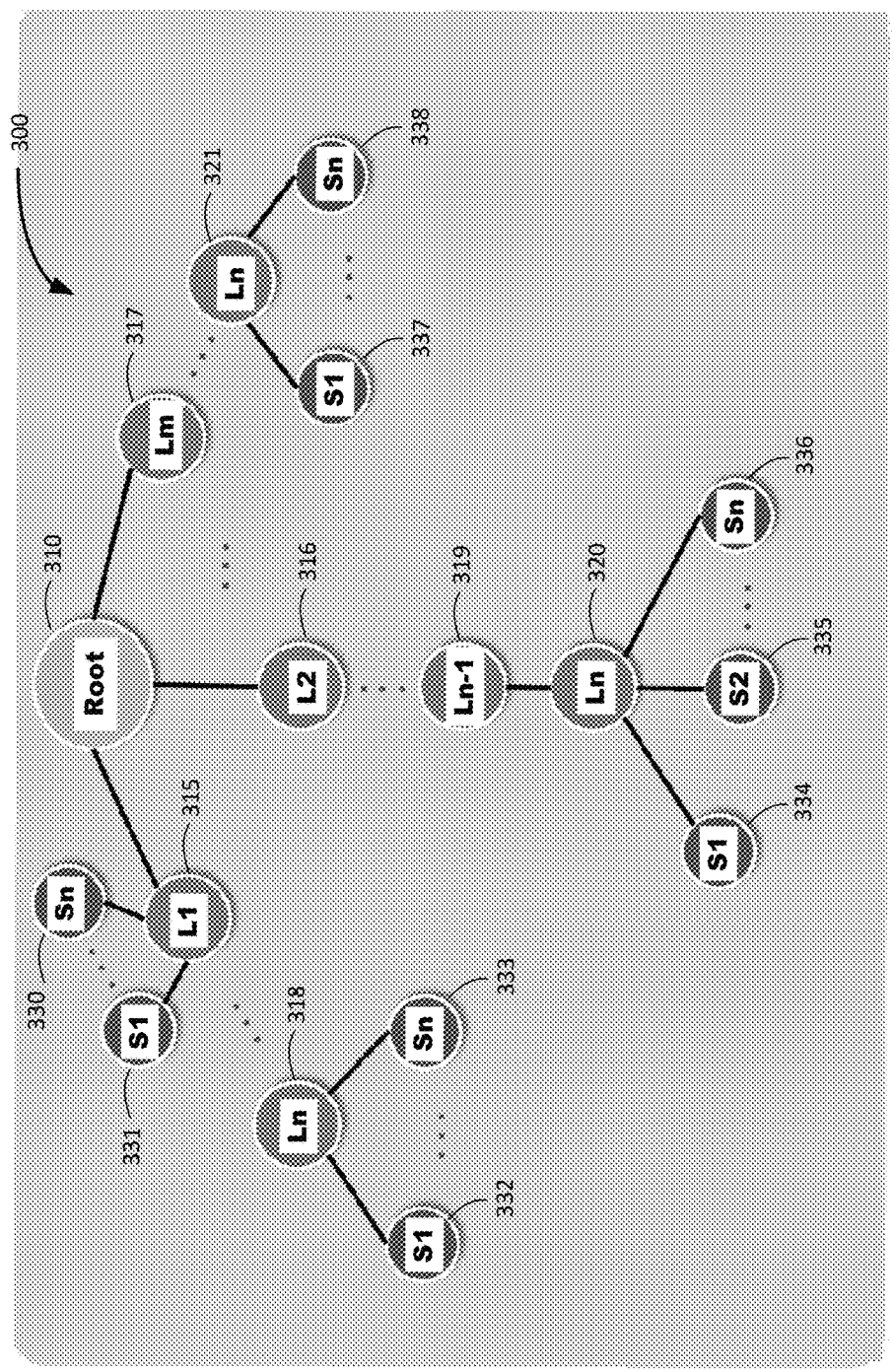
FIG. 3 depicts an exemplary sensor network where a root node has multiple link nodes, according to an example embodiment.

FIG. 3 depicts an exemplary sensor network 300 where a root node has multiple link nodes, according to an example embodiment. As shown in FIG. 3, the root node 310 can have 1 to m branches. Along a given branch, starting at a root node, are up to n link nodes (e.g., link nodes 315-321). In an example embodiment, a link node (e.g., link node 319) can have one parent link node (e.g., link node 316), and one child link node (e.g., link node 320). In another example embodiment, a link node (e.g., link node 318) can have one parent link node (e.g., link node 315), and zero child link nodes. A link node can have up to n sensor nodes (e.g., sensor nodes 330-338). The communication protocol described above in connection with FIG. 1 can be extended to more complicated sensor networks, such as sensor network 300, that have more than one link node and/or more than one root node.

Figure 4:
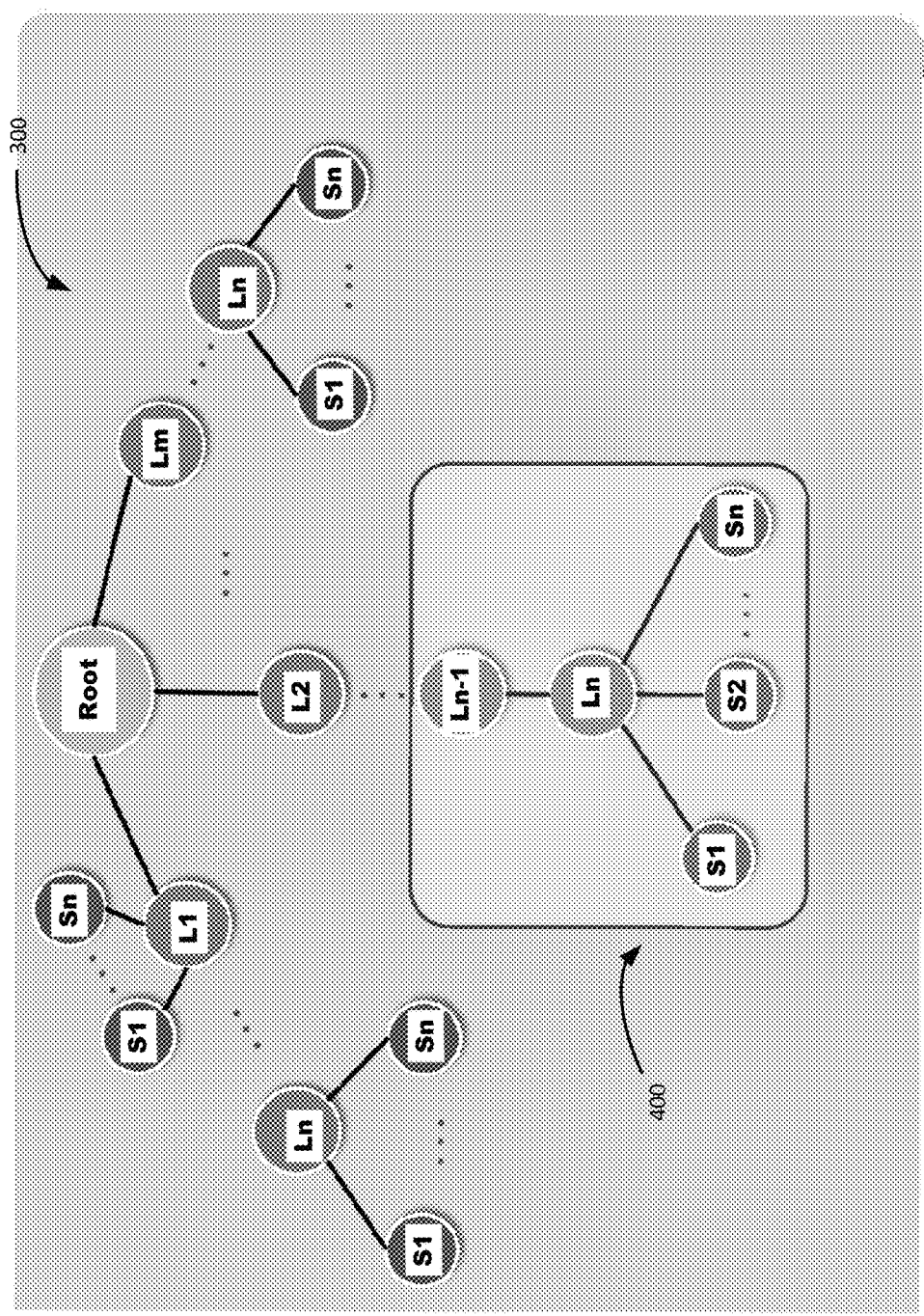
FIG. 4 illustrates a sub-network in the exemplary sensor network of FIG. 3, according to an example embodiment.

FIG. 4 illustrates a sub-network 400 in the exemplary sensor network 300 of FIG. 3, according to an example embodiment. The sensor network system described herein implements a communication protocol that focuses on localized point-to-point link communication on a sub-network within the network hierarchy. The communication protocol includes command and response communications between the child and parent link nodes with forwarding capability along a branch from the root node. The sensor network supports event driven, burst data transfer between the child and parent link nodes. The complexity of processing the data is pushed up to the root node. The communication protocol described herein operates at this subnetwork level which greatly reduces the complexity of communication within a larger sensor network. The design is hierarchical in nature such that from the perspective of a link node, it has exactly one parent node which is either a root node or another link node, and one or more children which can be zero, or one link node and zero or more sensing nodes.

Figure 5:
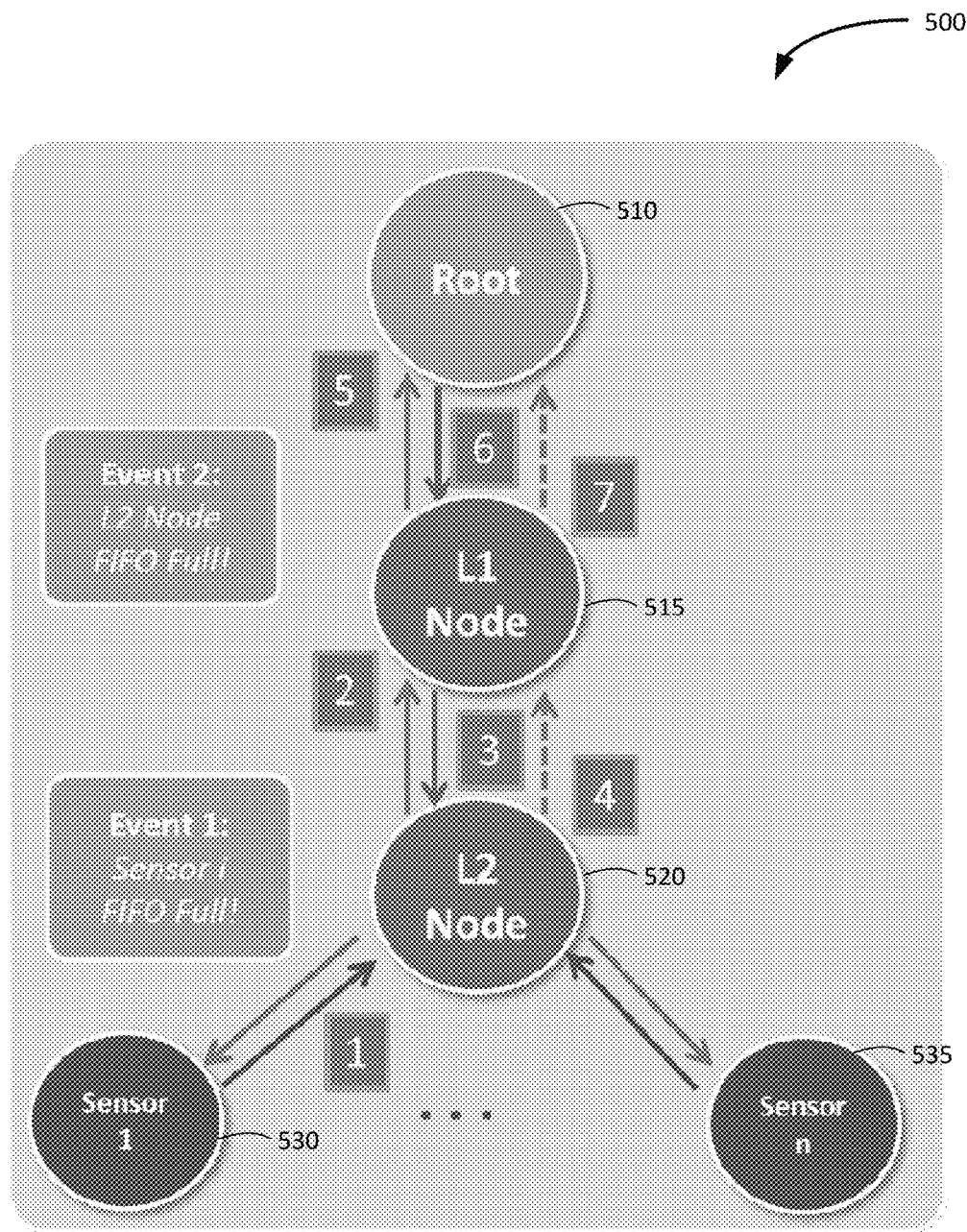
FIG. 5 illustrates data flow in the sub-network shown in FIG. 4, according to an example embodiment.

FIG. 5 illustrates data flow in a sub-network 500, according to an example embodiment. The sensor 530 samples and stores sensor data in a FIFO data buffer (step 1). When the data buffer is full, the link node 520 sends a data ready message to the link node 515 (step 2). The link node 515 sends a ready to receive message to the link node 520 (step 3). In response, the link node 520 begins a burst data transfer of the data received from the sensor 530 (step 4). When the data buffer at the link node 515 is full, the link node 515 sends a data ready message to the root node 510 (step 5). The root node 510 sends a ready to receive message to the link node 515 (step 6). In response, the link node 515 begins a burst data transfer of the data stored in its data buffer (step 7).

Figure 6:
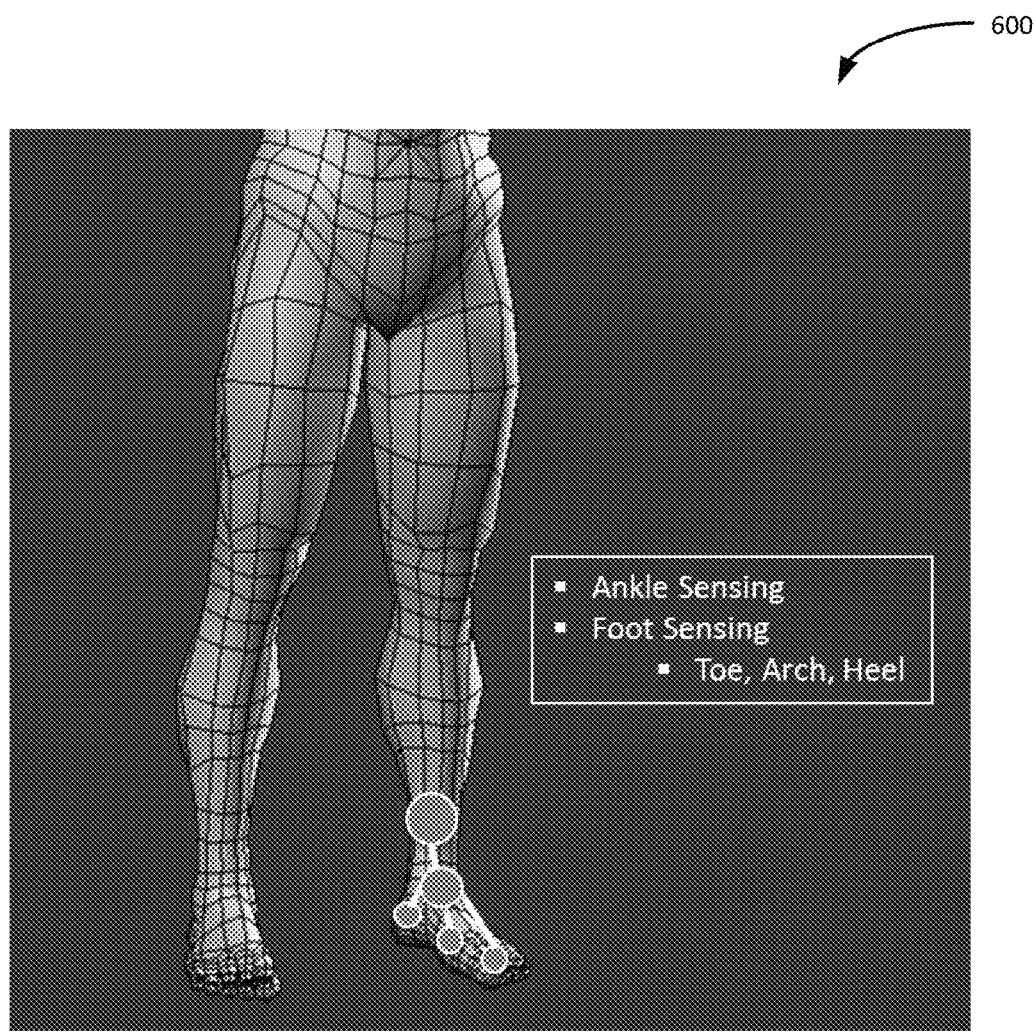
FIG. 6 illustrates an exemplary implementation of a sensor network for sensing and processing data at a foot, according to an example embodiment.
Figure 7:
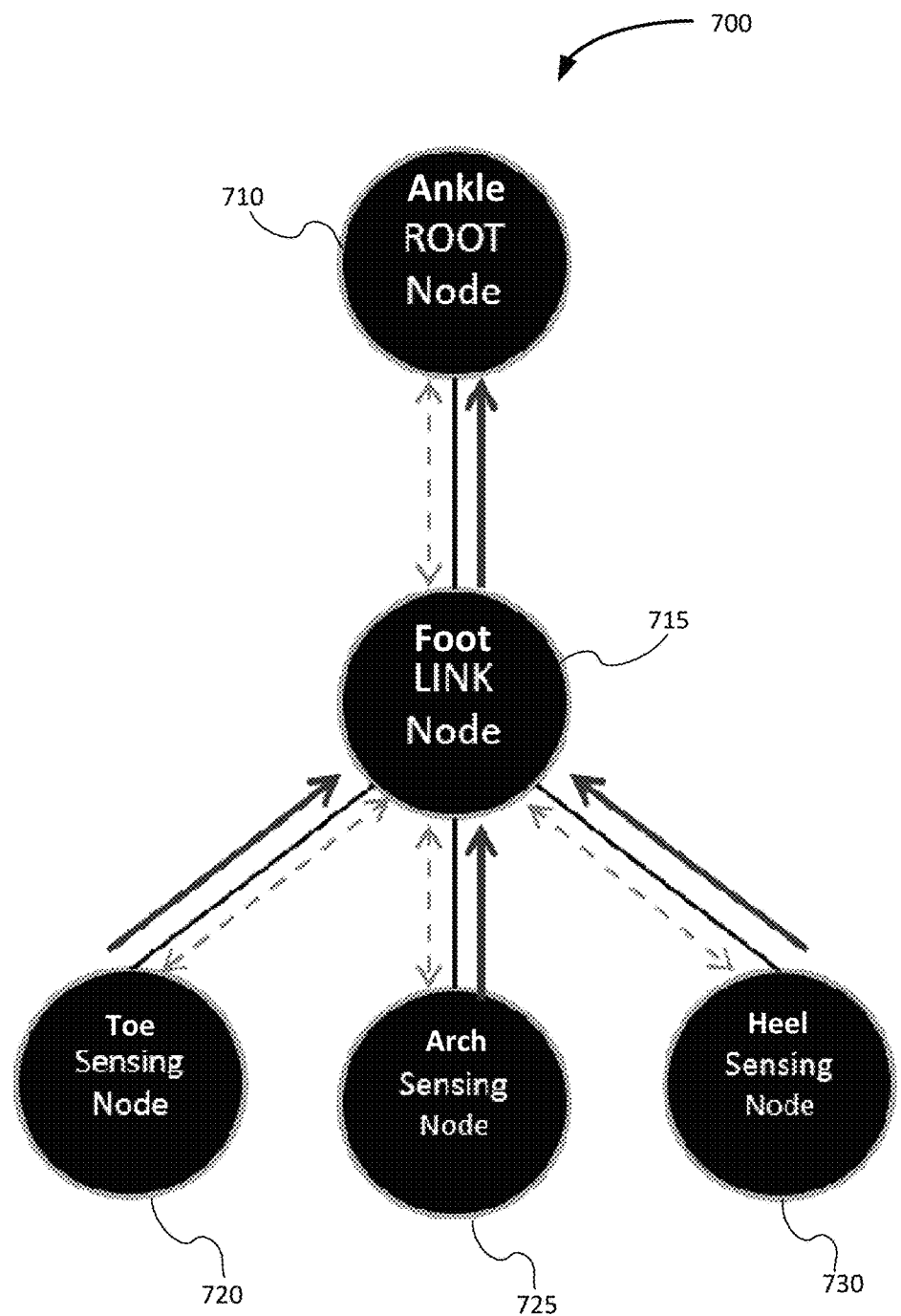
FIG. 7 depicts an exemplary sensor network for the exemplary implementation of FIG. 6, according to an example embodiment.

FIG. 6 illustrates an exemplary implementation 600 of a sensor network for sensing and processing data at a foot, according to an example embodiment. A person may wear clothing embedded with the sensor network on his or her leg near the ankle or the sensor network may be embedded in the foot insoles. The embedded sensor network may be configured to sense physiological data from the ankle, the foot, the toes, the heel, and/or the arch. FIG. 7 depicts an exemplary sensor network 700 for the exemplary implementation 600 shown in FIG. 6. The exemplary sensor network 700 is configured to sense data at a person's foot. As such, the sensor network 700 includes nodes at various parts of a person's ankle and foot. The sensor network 700 includes an ankle root node 710 that is located at the person's ankle and a foot link node 715 that is located at the person's foot. The sensor network 700 also includes a toe sensing node 720 that is located at the person's toe, an arch sensing node 725 at the person's arch, and a heel sensing node 730 at the person's heel. Similar to the sensor network 100 of FIG. 1, the ankle root node 710 is in wired connection with the foot link node 715, and the foot link node 715 is in wired connection with the toe sensing node 720, the arch sensing node 725, and the heel sensing node 730. The foot link node 715 does not process native commands that are destined for sensing nodes. The foot link node 715 is responsible for data management across the sensing nodes 720, 725, 730. In command-response mode, the foot link node 715 acts as a message router to forward messages to and from the ankle root node 710 and the sensing nodes 720, 725, 730, which reduces the complexity of processing data in the sensor network 700.

Figure 8:
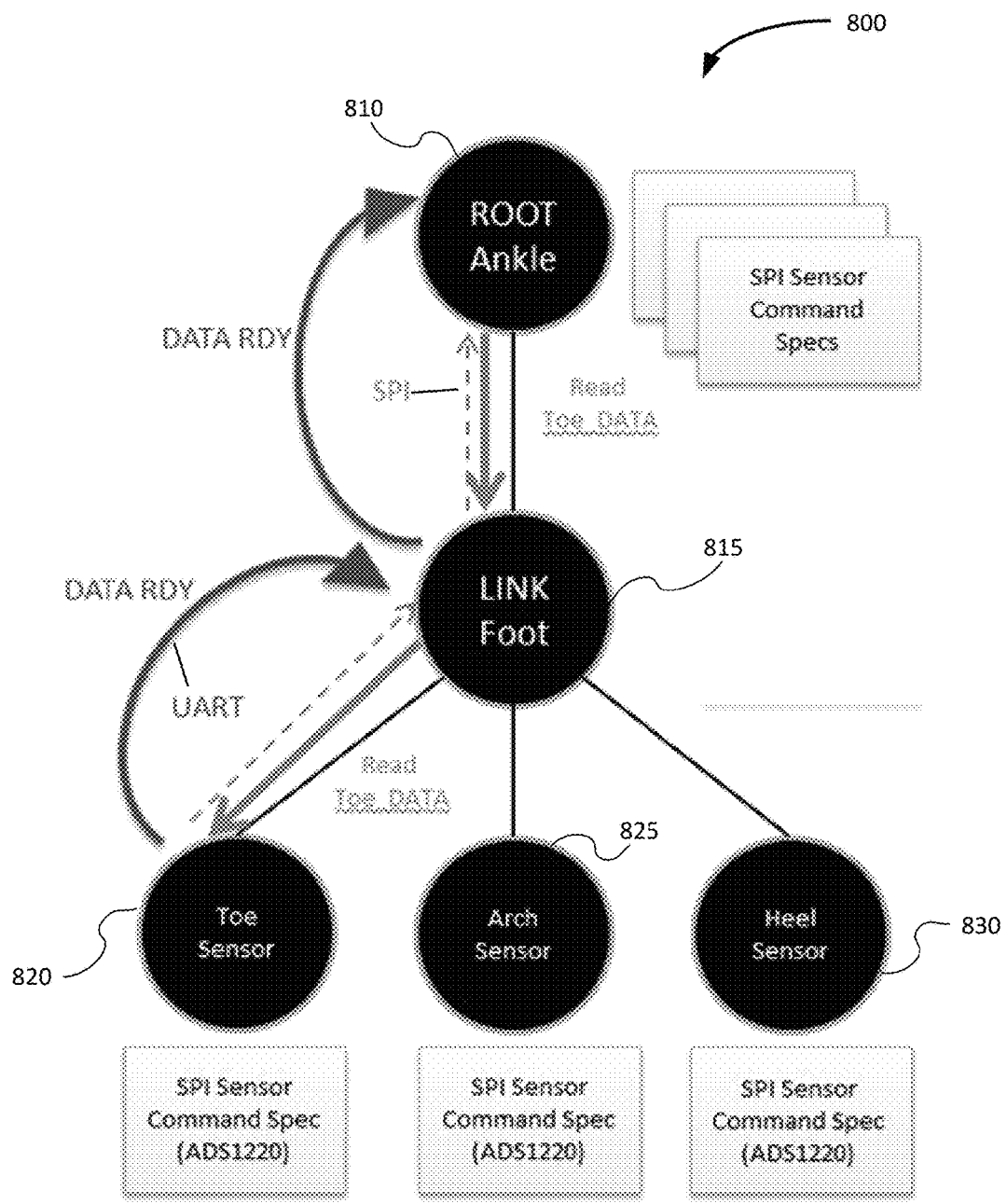
FIG. 8 illustrates data flow in the exemplary sensor network depicted in FIG. 7, according to an example embodiment.

FIG. 8 illustrates data flow in the exemplary sensor network 700 depicted in FIG. 7, according to an example embodiment. In an example embodiment, the sensor network 700 may include SPI synchronous links and UART asynchronous callback links. In FIG. 8, the sensor network 800 represents a simple network with a root node 810 at the ankle, a foot link node 815, and three sensors 820, 825, 830 on the foot which each measure directional load. The sensors 820, 825, 830 may be sensors that are SPI-compatible, and may be an ADS1220 small-signal sensor manufactured by Texas Instruments™. If the ankle root node 810 wants to send a data request message to read the toe sensor's 820 load which can be accessed via a native SPI command that is defined by the sensor, the root node 810 can create a data packet with metadata identifying the toe sensor 820 as the destination node and include the native SPI command(s) in the data payload. The ankle root node 810 sends this message along the node path of Ankle (810)-Foot (815)-Toe (820). Given the necessary information encoded in the data packet, the foot link node 815 can forward the packet to the toe sensing node 820, instead of processing the SPI command payload itself at the foot link node 815. As described above, the foot link node 815 is configured to perform minimal processing, and does not process the SPI commands for the sensors. When a response is ready from the toe sensing node 820, a UART asynchronous callback is sent back up the path.

Figure 9:
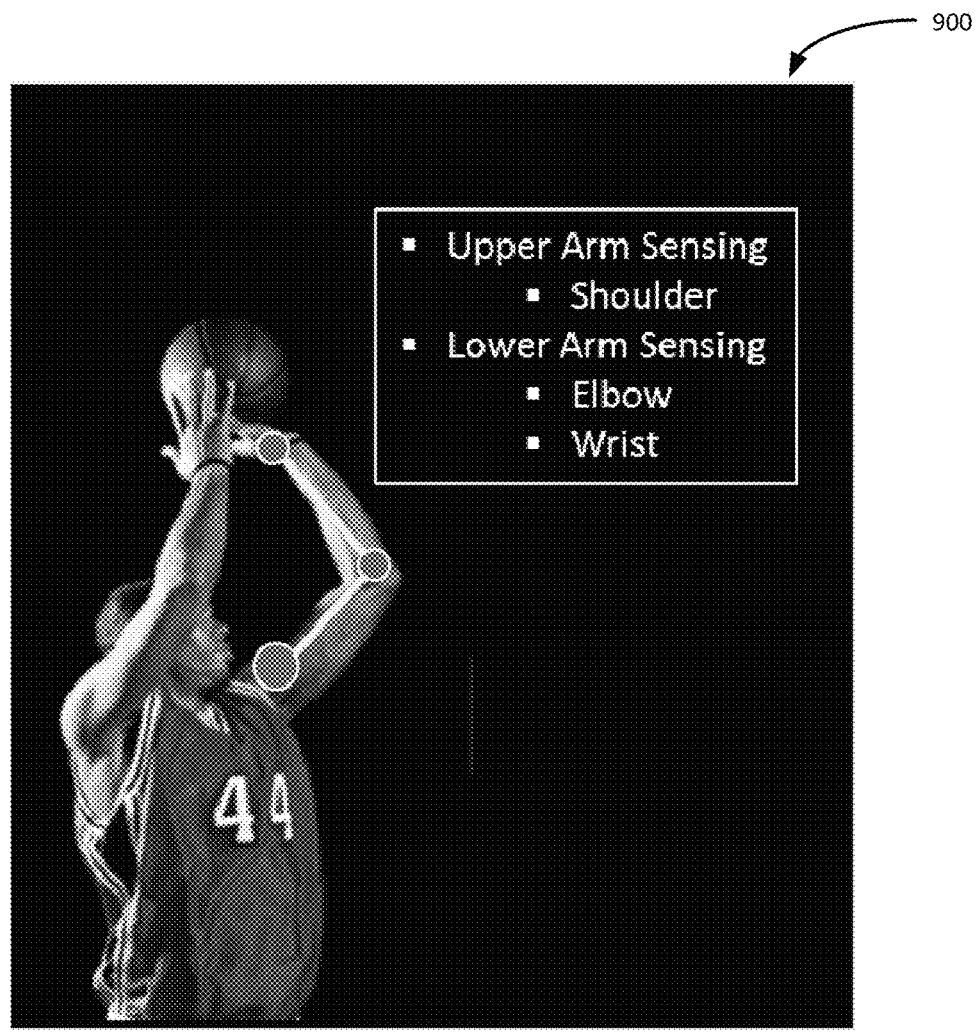
FIG. 9 illustrates an exemplary implementation of a sensor network for sensing and processing data at an arm, according to an example embodiment.

FIG. 9 illustrates an exemplary implementation 900 of a sensor network for sensing and processing data at an arm, according to an example embodiment. A person may wear clothing embedded with the sensor network on his or her arm starting at the shoulder. The embedded sensor network may be configured to sense physiological data from the shoulder, the elbow, the forearm, and/or the wrist. The exemplary sensor network for this implementation may be configured as sensor network 100 of FIG. 1, and can include a shoulder root node, an elbow link node, multiple elbow sensing nodes, a wrist link node, and/or multiple wrist sensing nodes. Similarly to the sensor network 100 of FIG. 1, the shoulder root node is in wired connection with the elbow link node, and the elbow link node is in wired connection with the elbow sensing nodes. The elbow link node is also in wired connection with the wrist link node, and the wrist link node is in wired connection with the wrist sensing nodes. The sensor network implementing this embodiment is further illustrated and discussed in relation to FIGS. 10A and 10B below.

The data management protocol for the sensor network system described herein enables the root node to dynamically change the rate of data transfer among link and sensor nodes by adjusting the size of in-memory data buffers (for example, a FIFO data buffer) managed by the link node. Since transmissions in the sensor network yield significant current draw, reducing the rate of data transmission allows for conservation of power in the sensor network. The rate of data transfer from link node back up to the root node can be determined by the sample size of the data buffer and the speed of the synchronous/asynchronous hardware links. Thus, the root node is configured to decrease or increase the size of the link node's data buffer based on information computed or acquired by the root node about the activity of the link node in the sensor network. For similar reasons, the root node can decrease or increase the size of the data buffer at each of the sensing nodes.

To demonstrate the value of the dynamic data management, consider another example. For example the sensor network may include motion sensors (each including accelerometer, gyro, and magnetometer, which together produce an orientation value orientation value about the x, y, z axes), at each joint on the human body. If the sensor network of motion sensors is configured to detect acceleration and orientation of limbs, high level activities performed in a sport such as basketball can be detected. Based on the speed of motion in an activity, the sensor network can automatically adjust the frequency of data transmissions. Lower speed motion of activity requires lower resolution data, and therefore data transmissions can be reduced per unit time. On the other hand, for higher speed motion of activity, higher resolution data is needed and therefore, higher frequency transmissions are needed. Thus, the sensor network enables conditional adjustment of the data transmission frequency based on the need for physiological data capture.

For example, if detecting the motion of an athlete's shooting arm is of interest, the sensor network may be configured to collect high resolution acceleration and orientation motion data of the shooting arm on offense (i.e. to sample more frequently to acquire a greater number of samples per second at those times when the athlete may be shooting the ball).

However, when the athlete is playing defense, the shooting arm will rarely (if at all) be in shooting motion. Rather, the shooting arm, along with the other arm will be in a defensive pose as the player is guarding another player from the opposing team. In this scenario, collecting high resolution motion data of the shooting arm is not as important or necessary. Thus, there is an opportunity to either shutdown data collection in the sensor network on the shooting arm or greatly reduce the rate of sampling (for example, the size of the data buffer may be increased so that the sensor network does not transfer data as often to the root node for processing). In other words, in the context of measuring the motion of shooting a basketball, when an athlete is on defense, the sensor network can afford to be conservative in collecting the necessary motion data, thereby conserving power. But when an athlete is playing offense, the sensor network can be greedy in collecting data as fast as possible and consume more power.

Figures 10A, 10B:
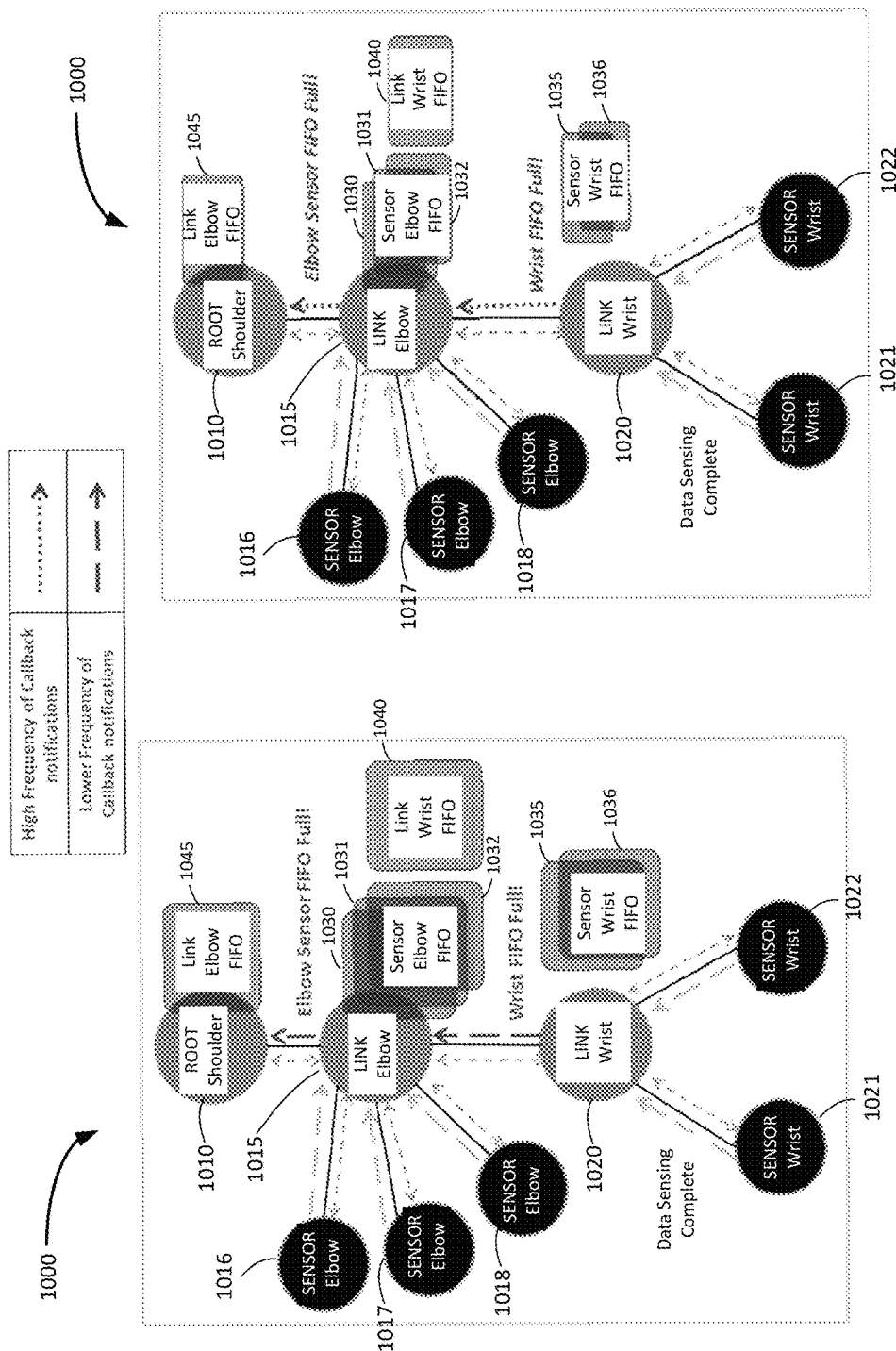
FIG. 10A illustrates data flow in an exemplary sensor network with lower frequency of data transfers, according to an example embodiment.
FIG. 10B illustrates data flow in an exemplary sensor network with higher frequency of data transfers, according to an example embodiment.

FIG. 10A illustrates data flow in an exemplary sensor network 1000 for the exemplary implementation 900 of FIG. 9, depicting a lower frequency of data transfers, according to an example embodiment. The exemplary sensor network 1000 for sensing and processing data at an arm can include a shoulder root node 1010, an elbow link node 1015, elbow sensing nodes 1016, 1017, and 1018, a wrist link node 1020, and wrist sensing nodes 1021 and 1022. As shown in FIG. 10A, the elbow link node 1015 maintains and controls a FIFO data buffer (e.g., data buffers 1030, 1031, and 1032) for data sensed by each of the elbow sensing nodes 1016-1018. Similarly, the wrist link node 1020 maintains and controls a FIFO data buffer (e.g., data buffers 1035 and 1036) for each of the wrist sensing nodes 1021-1022. The elbow link node 1015 also maintain and controls a FIFO data buffer (e.g., data buffer 1040) for its child link node—wrist link node 1020. The shoulder root node 1010 also maintains and controls a FIFO data buffer (e.g., data buffer 1045) for its child link node—elbow link node 1015. In FIG. 10A, the size of the data buffers 1030-1032, 1035, 1036, and 1040 is large (compared to FIG. 10B), thus, the data is transferred to the shoulder root node 1010 at a lower frequency. This configuration is beneficial for collecting data while the athlete is on defense and not shooting the ball as often. As shown in FIG. 10A, during defense the root node can increase the size of the data buffers so the frequency of "data buffer full" notifications occur less often and data is transmitted back to the root node less frequently.

FIG. 10B illustrates data flow in the exemplary sensor network 1000 for the exemplary implementation 900 of FIG. 9, depicting a higher frequency of data transfers, according to an example embodiment. In FIG. 10B, the size of the data buffers 1030-1032, 1035, 1036, and 1040 is small (compared to FIG. 10A), thus, the data is transferred to the shoulder root node 1010 at a higher frequency compared to that in FIG. 10A. This configuration is beneficial when the athlete is on offense and is shooting the ball. As shown in FIG. 10B, during offense the root shoulder node 1010 can decrease the size of the data buffers 1030-1032, 1035, 1036, and 1040 so that data transfers back to the shoulder root node occur more frequently since the "data buffer full" notifications occur more frequently.

Figure 11:
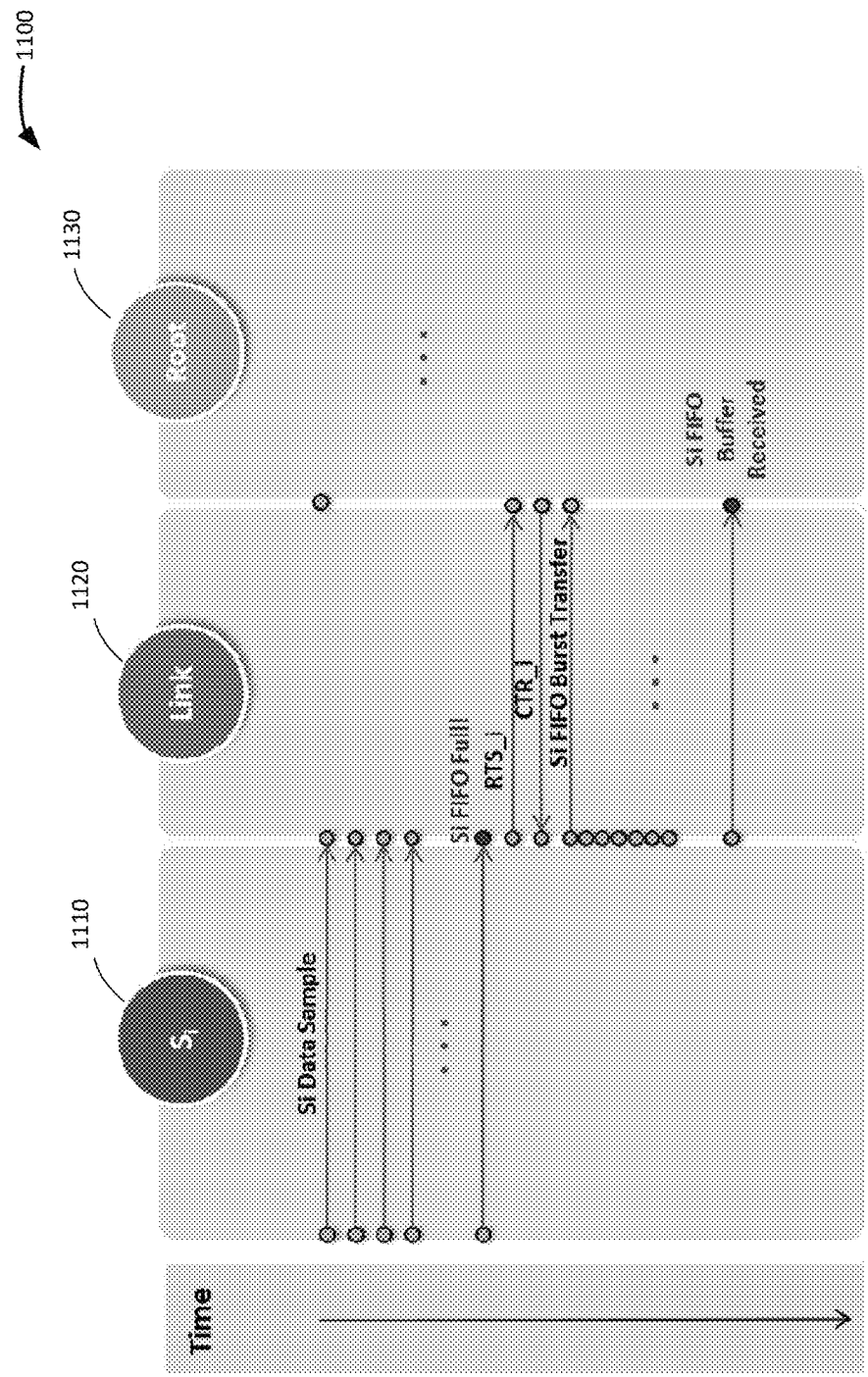
FIG. 11 illustrates data flow in an exemplary software architecture for processing data in a sensor network, according to an example embodiment.

FIG. 11 illustrates data flow over time in an exemplary software architecture 1100 for processing data in a sensor network, according to an example embodiment. As shown in FIG. 11, the software architecture 1100 includes sensing node 1110 for communication data sensed by the sensors. Link node 1120 handles serial communications (tx/rx) with the root node 1130, and is also responsible for data management for each sensing node using data buffers. The link node 1120 may handle data management for each sensing node and/or a child link node as separate concurrent tasks.

Figure 12:
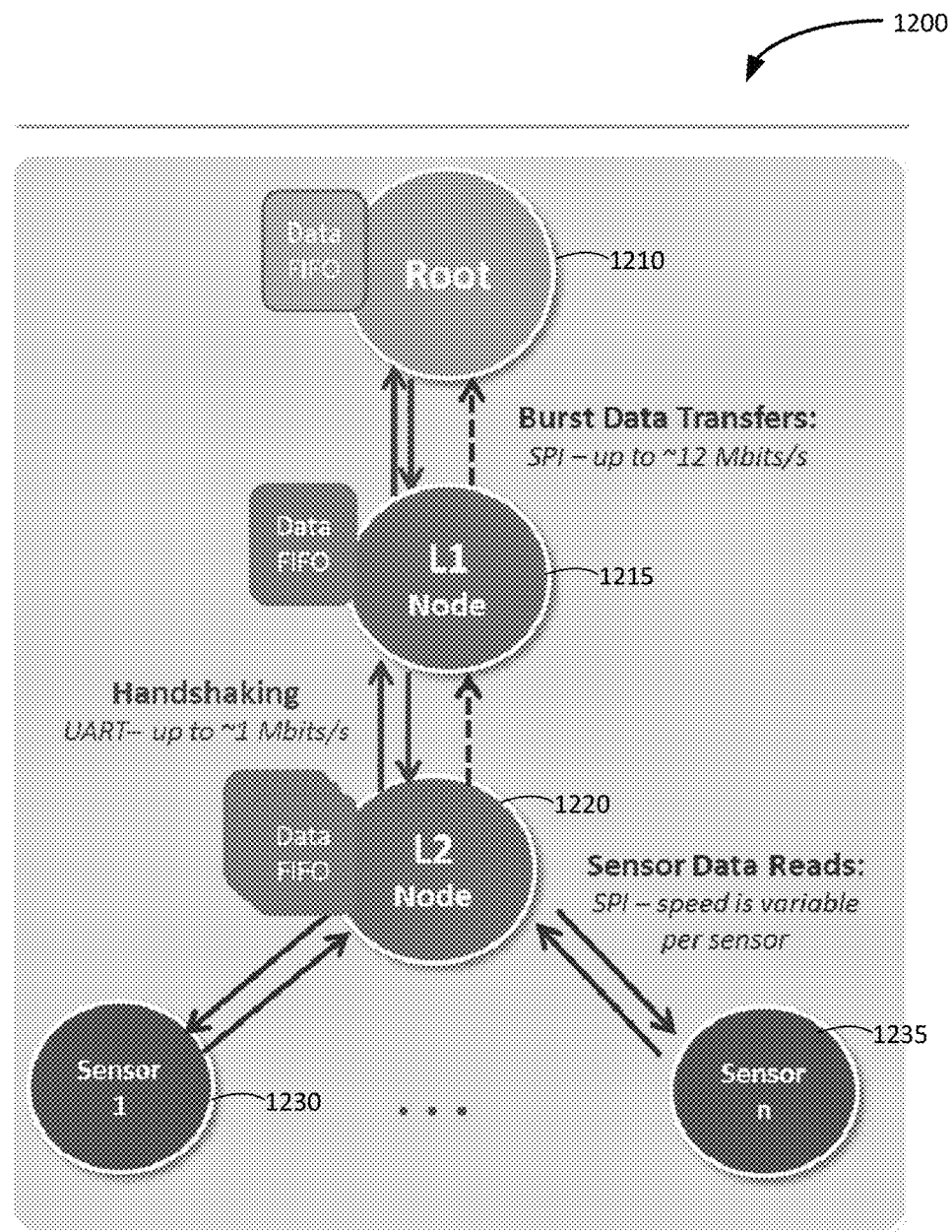
FIG. 12 illustrates an exemplary hardware architecture for a sensor network, according to an example embodiment.

FIG. 12 illustrates an exemplary hardware architecture 1200 for a sensor network, according to an example embodiment. The root node 1210 aggregates data from one or more link nodes and/or sensing nodes. The root node 1210 manages the schedule for servicing each node's FIFO data buffer. In some embodiments, the root node 1210 may also be configured to push data to a remote base station. The link node 1220 aggregates data from one or more sensing nodes (e.g., 1230, 1235). The link node 1215 aggregates data from the child link node 1220. The link nodes 1215, 1220 manage the schedule for servicing each FIFO data buffer at the sensing nodes and the child link nodes. The link nodes 1215, 1220 handle serial communications and sensor data management in separate concurrent tasks. The sensing nodes 1230, 1235 are controlled by a link node (e.g., link node 1220). The sensing nodes 1230, 1235 acquire data and transmits the data to the link node (e.g., link node 1220). The data sample may be retrieved from the sensing nodes 1230, 1235 using command/response or interrupt notification.

Figure 13:
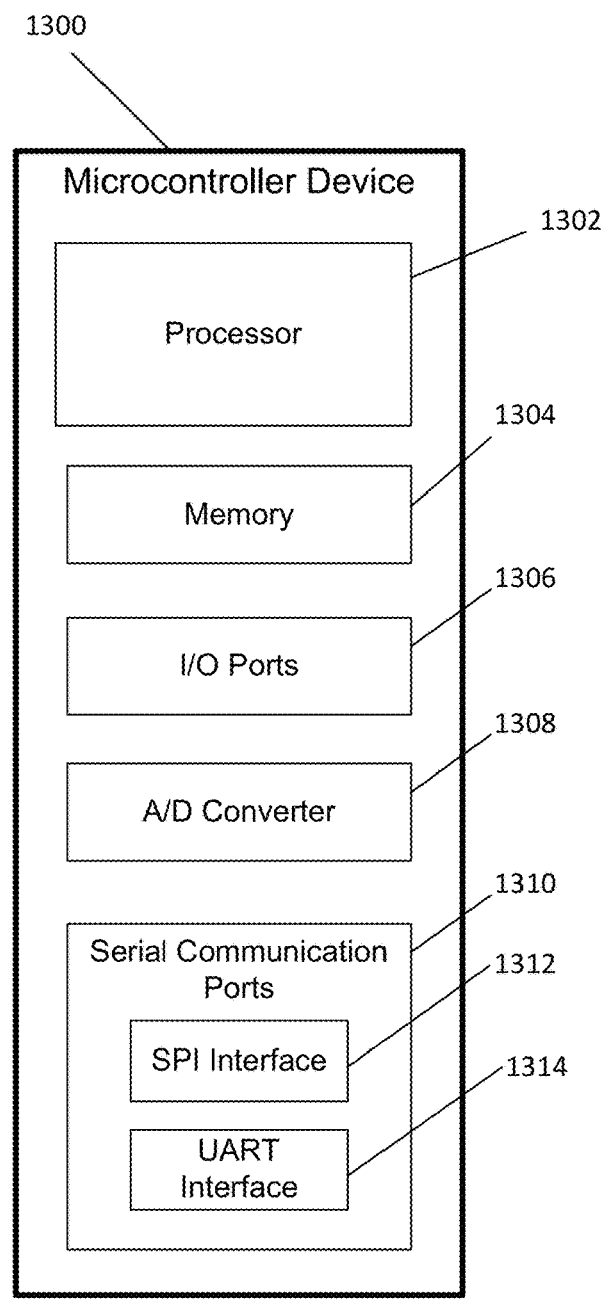
FIG. 13 is a block diagram of an exemplary microcontroller or microprocessor device that can be used to implement exemplary embodiments of the sensor network system described herein.

FIG. 13 is a block diagram of an exemplary microcontroller or microprocessor device 1300 that can be used to implement exemplary embodiments of the sensor network system described herein. The exemplary microcontroller device 1300 is a small system on a chip (SoC) that is a single integrated circuit, and may include a processor 1302, a memory 1304, and input/output (I/O) ports 1306. In an example embodiment, the root node 110 and/or the link node 115 may include one or more components of the microcontroller or microprocessor device 1300.

The microcontroller device 1300 includes a non-transitory computer-readable medium for storing one or more computer-executable instructions or software for implementing exemplary embodiments. For example, memory 1304 included in the microcontroller device 1300 may store computer-readable and computer-executable instructions or software for implementing exemplary embodiments of the sensor network system described herein. The microcontroller device 1300 also includes configurable and/or programmable processor 1302 for executing computer-readable and computer-executable instructions or software stored in the memory 1304 and other programs for controlling system hardware. Processor 1302 may be a single core processor or multiple core processor.

Memory 1304 may include a computer system memory or random access memory, such as DRAM, SRAM, EEPROM, RAM, and the like. Memory 1304 may include other types of memory as well, or combinations thereof.

The microcontroller device 1300 also includes input/output (I/O) ports 1306 to receive signals or data, or transmit signals or data to various components of the sensor network system described herein. The microcontroller device 1300 may also include an analog-to-digital (A/D) converter 1308 that converts analog voltage to binary numbers (digital data).

The microcontroller device 1300 may also include serial communications ports 1310, including a SPI interface 1312 and a UART interface 1314. In some embodiments, the microcontroller device 1300 may also support parallel communications.

There are various advantages of the sensor network system described herein. The communication protocol of the sensor network system can run on top of lower level synchronous and asynchronous communication links, whether they are implemented in hardware (i.e. SPI, UART, I2C) or software. The communication protocol described herein allows for dynamic power conservation in the network, by dynamically managing the size of the data buffers (hence, changing the rate of data transfer through the network). The communication protocol is also lightweight in that only a small memory footprint is required for link nodes implementing the protocol. The complexity of processing in embodiments is pushed to the root node while processing data request commands is pushed to the sensing nodes.

Although exemplary implementations of the sensor network system are described herein for use in smart wearable clothing, the sensor network system may be implemented for use in other technical fields. For example, the sensor network system can be implemented for monitoring cognitive data. The communication protocol for the sensor network system may be used in satellite hardware to hardware communication especially in a sensor network with low power requirements. The communication protocol for the sensor network system may also be used in monitoring security via ground vibration detection. In this example, all the tethered units (sensors) are in "sleep" mode until ground vibrations are detected that exceed a threshold value which causes the tethered units to securely transmit a callback to the next node in the network. Thus, presence of persons or vehicles can be detected securely by installing a tethered sensor network in the ground.

The sensor network system may also be used as a weather instrument to save power until notified when one of its sensors is activated due to a weather condition. The sensor network system may also be used for monitoring automobiles, especially in electric cars, for monitoring co-located tire pressure sensor, UV and RPM over a similar tree path. The sensor network system may also be used in airplane redundant systems design with low level component design (redundancy is a requirement in airplanes). The sensor system may also be used in smart phones. While most phones have a robust microcontroller, if sensing is pushed down to a low power microcontroller with threshold callbacks it saves the robust microcontroller power.

The description herein is presented to enable a person skilled in the art to create and use a system configuration and related method and article of manufacture for processing data in a sensor network. Various modifications to the example embodiments will be readily apparent to those skilled in the art, and the generic principles defined herein may be applied to other embodiments and applications without departing from the spirit and scope of the invention. Moreover, in the description herein, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A system for dynamic power usage and data transfer rate management in a sensor network including synchronous links and asynchronous links, the system comprising:
   a root node that includes a microcontroller or microprocessor device, the root node configured to generate and send a data read request command;
   a link node that maintains one or more data buffers, the link node in wired communication with the root node and configured to receive the data read request command from the root node and route the data read request command to a destination sensor among a plurality of sensors; and
   the plurality of sensors, each of the plurality of sensors in wired communication with the link node, the destination sensor among the plurality of sensors configured to sense data and store the data in at least one of the one or more data buffers maintained by the link node based on the data read request command,
   wherein the root node is configured to send a command during operation to the link node to dynamically increase or decrease a size of the one or more data buffers maintained by the link node to manage power usage and a rate of data transfer in the sensor network, the command based on information computed or acquired by the root node about activity of the link node.

2. The system of claim 1, wherein the data read request command from the root node is accompanied by metadata identifying the destination sensor and the link node is further configured to route the data read request command to the destination sensor based on the metadata included with the data read request command, the link node not processing the data read request command.

3. The system of claim 1, wherein the destination sensor is configured to generate and send a data sensing complete message using an asynchronous link to the link node when the sensor has completed sensing data per the data read request command, and
wherein the link node is configured to generate and send a data ready message using an asynchronous link to the root node when the at least one of the one or more data buffers maintained by the link node is full.

4. The system of claim 1, wherein after receiving a message from the root node to empty at least one of the one or more data buffers, the link node is configured to send the stored data from the one or more data buffers to the root node in response to the received message.

5. The system of claim 1, wherein the synchronous links are serial peripheral interface bus (SPI) links and the asynchronous links are universal asynchronous receiver/transmitter (UART) links.

6. The system of claim 1, wherein the root node is configured to increase the size of the data buffer maintained by the link node to reduce the rate of data transfer and conserve power in the sensor network.

7. The system of claim 1, wherein the root node is configured to decrease the size of the data buffer maintained by the link node to increase the rate of data transfer and power usage in the sensor network.

8. The system of claim 1, wherein the sensor network is embedded in clothing to monitor and sense physiological data of a body.

9. The system of claim 1, wherein the plurality of sensors include at least one motion sensor that is at least one of an accelerometer, gyro, and magnetometer.

10. A method for dynamic power usage and data transfer rate management in a sensor network including synchronous links and asynchronous links, the system comprising:
generating at a root node a data read request command for a destination sensor among a plurality of sensors;
sending the data read request command to a link node in wired communication with the root node, the link node maintaining one or more data buffers;
routing the data read request command from the link node to the destination sensor among the plurality of sensors, the plurality of sensors each in wired communication with the link node;
sensing data at the destination sensor in response to receiving the data read request command;
storing the sensed data in at least one of the one or more data buffers maintained by the link node; and)
sending a command during operation from the root node to the link node to dynamically increase or decrease a size of the one or more data buffers maintained by the link node to manage power usage and a rate of data transfer in the sensor network, the command generated by the root node based on information computed or acquired by the root node about activity of the link node.

11. The method of claim 10 wherein the data read request command from the root node is accompanied by metadata identifying the destination sensor, the method further comprising:
routing the data read request command from the link node to the destination sensor based on the metadata included with the data read request command, the link node not processing the data read request command.

12. The method of claim 10, further comprising:
generating and sending a data sensing complete message from the destination sensor to the link node using an asynchronous link when the destination sensor has completed sensing data per the data read request command;
generating and sending a data ready message from the link node to the root node using an asynchronous link when the at least one of the one or more data buffers maintained by the link node is full;
returning a ready to receive message from the root node to the link node; and
transmitting the data in the at least one of the one or more data buffers maintained by the link node to the root node in response to ready to receive message.

13. The method of claim 10, wherein the size of the at least one data buffer maintained by the link node is increased to reduce the rate of data transfer and conserve power in the sensor network.

14. The method of claim 10, wherein the size of the at least one data buffer maintained by the link node is decreased to increase the rate of data transfer and power usage in the sensor network.

15. The method of claim 10, wherein the link node is in wired connection with a child link node, the child link node maintaining its own data buffer.

16. A non-transitory computer readable medium storing instructions for dynamic power usage and data transfer rate management in a sensor network including synchronous links and asynchronous links , the instructions when executed by a processor:
generating at a root node a data read request command for a destination sensor among a plurality of sensors;
sending the data read request command to a link node in wired communication with the root node, the link node maintaining one or more data buffers;
routing the data read request command from the link node to the destination sensor among the plurality of sensors, the plurality of sensors each in wired communication with the link node;
sensing data at the destination sensor in response to receiving the data read request command;
storing the sensed data in at least one of the one or more data buffers maintained by the link node; and
sending a command during operation from the root node to the link node to dynamically increase or decrease a size of the one or more data buffers maintained by the link node to manage power usage and a rate of data transfer in the sensor network, the command generated by the root node based on information computed or acquired by the root node about activity of the link node.

17. The medium of claim 16, wherein the data read request command from the root node is accompanied by metadata identifying the destination sensor, and the instructions when executed by a processor further:
routing the data read request command from the link node to the destination sensor based on the metadata included with the data read request command, the link node not processing the data read request command.

18. The medium of claim 16, the instructions when executed by a processor further:
generating and sending a data sensing complete message from the destination sensor to the link node using an asynchronous link when the destination sensor has completed sensing data per the data read request command;
generating and sending a data ready message from the link node to the root node using an asynchronous link when the at least one of the one or more data buffers maintained by the link node is full;

returning a ready to receive message from the root node to the link node; and transmitting the data in the at least one of the one or more data buffers maintained by the link node to the root node in response to ready to receive message.

19. The medium of claim 16, wherein the size of the at least one data buffer maintained by the link node is increased to reduce the rate of data transfer and conserve power in the sensor network.

20. The medium of claim 16, wherein the size of the at least one data buffer maintained by the link node is decreased to increase the rate of data transfer and power usage in the sensor network.

* * * * *